US010726253B2

(12) United States Patent
Tsuji

(10) Patent No.: US 10,726,253 B2
(45) Date of Patent: Jul. 28, 2020

(54) IMAGE FORMING APPARATUS

(71) Applicant: KYOCERA Document Solutions Inc., Osaka (JP)

(72) Inventor: Takuya Tsuji, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 66 days.

(21) Appl. No.: 16/149,782

(22) Filed: Oct. 2, 2018

(65) Prior Publication Data

US 2019/0180096 A1 Jun. 13, 2019

(30) Foreign Application Priority Data

Dec. 13, 2017 (JP) ................. 2017-238301

(51) Int. Cl.
*G06K 9/00* (2006.01)
*H04N 1/00* (2006.01)
*G06F 40/242* (2020.01)

(52) U.S. Cl.
CPC ....... *G06K 9/00463* (2013.01); *G06F 40/242* (2020.01); *H04N 1/00037* (2013.01); *H04N 1/00331* (2013.01); *G06K 2209/01* (2013.01)

(58) Field of Classification Search
CPC .. G06K 9/00456; G06K 9/00463; G06K 9/66; G06K 9/00442; G06K 9/2054; G06K 2209/01; G06K 9/34; G06K 9/344; G06K 9/342; G06K 9/348; G06K 9/346; G06K 9/03; G06K 9/6262; G06K 9/38; H04N 1/40062; G06T 7/0081; G06T 2207/30176; G06T 2207/20144; G06T 7/0083;

(Continued)

(56) References Cited

U.S. PATENT DOCUMENTS 4,914,709 A * 4/1990 Rudak ............... G06K 9/033
235/437
6,005,973 A * 12/1999 Seybold ........... G06K 9/00872
382/187

(Continued)

FOREIGN PATENT DOCUMENTS

CN 101211243 A 7/2008
CN 101257549 A 9/2008

(Continued)

OTHER PUBLICATIONS

Chinese Office Action dated Jan. 21, 2020, issued by the National Intellectual Property Administration in corresponding application CN 201811147375.5.

*Primary Examiner* — Duy M Dang
(74) *Attorney, Agent, or Firm* — Stein IP, LLC

(57) ABSTRACT

An image forming apparatus has an image reading portion, a storage portion, an image processing portion, a loss detecting portion, and a text correcting portion. The image reading portion reads a document image. The storage portion stores dictionary data containing a plurality of characters and words. The image processing portion acquires character data by performing character recognition on the document image. The loss detecting portion detects a lost part in the character data based on the dictionary data. When the character data has the lost part, the text correcting portion corrects the lost part with a character or word extracted as a candidate character or word for correcting the lost part from the dictionary data.

5 Claims, 3 Drawing Sheets

(58) Field of Classification Search
CPC ............ G06T 2207/10016; G06T 7/11; G06T 2207/20036; G06T 11/60; G03B 15/02; G03B 15/05; G03B 15/06; G03B 15/03; F21W 2131/406
See application file for complete search history.

(56) References Cited

U.S. PATENT DOCUMENTS

| | | | | |
|---|---|---|---|---|
| 6,014,460 | A * | 1/2000 | Fukushima | G06K 9/72 382/177 |
| 7,092,567 | B2 * | 8/2006 | Ma | G06K 9/723 382/177 |
| 2004/0264805 | A1 | 12/2004 | Harada et al. | 382/282 |
| 2008/0150910 | A1 | 6/2008 | Nakajima | 345/173 |
| 2008/0204778 | A1 | 8/2008 | Koarai | 358/1.9 |
| 2012/0072013 | A1 | 3/2012 | Hamamura et al. | 700/224 |

FOREIGN PATENT DOCUMENTS

| | | |
|---|---|---|
| CN | 102402682 A | 4/2012 |
| JP | 2004-272198 A | 9/2004 |

* cited by examiner

IMAGE FORMING APPARATUS

INCORPORATION BY REFERENCE

This application is based upon and claims the benefit of priority from the corresponding Japanese Patent Application No. 2017-238301 filed on Dec. 13, 2017, the entire contents of which are incorporated herein by reference.

BACKGROUND

The present disclosure relates to an image forming apparatus.

In image forming apparatuses such as a copier, when image formation based on a document image is performed by a copying function or the like, it is important that the document image be read properly from a document. There is known a conventional technology related to such reading of a document image.

An image reading control device according to the conventional technology extracts from a read image a region where a document exists, and detects the inclination of the region. Moreover, the image reading control device corrects the inclination of the region in accordance with the inclination of the region where the document exists, and sets a cutting width of the region of the document to be cut out from the image. Thus, it is possible to prevent the document from being partly lost, and to improve the accuracy of automatic cutting-out of the document image.

SUMMARY

According to one aspect of the present disclosure, an image forming apparatus includes an image reading portion, a storage portion, an image processing portion, a loss detecting portion, and a text correcting portion. The image reading portion reads a document image. The storage portion stores dictionary data in which a plurality of characters and a plurality of words are registered. The image processing portion acquires character data by performing a character recognition process on the document image. The loss detecting portion detects a lost part in the character data based on the dictionary data. When the character data has the lost part, the text correcting portion corrects the lost part with a character or word extracted as a candidate character or word for correcting the lost part from the dictionary data.

DETAILED DESCRIPTION

Hereinafter, with reference to the accompanying drawings, an embodiment of the present disclosure will be described. The present disclosure is not limited to what is disclosed herein.

Figure 1:
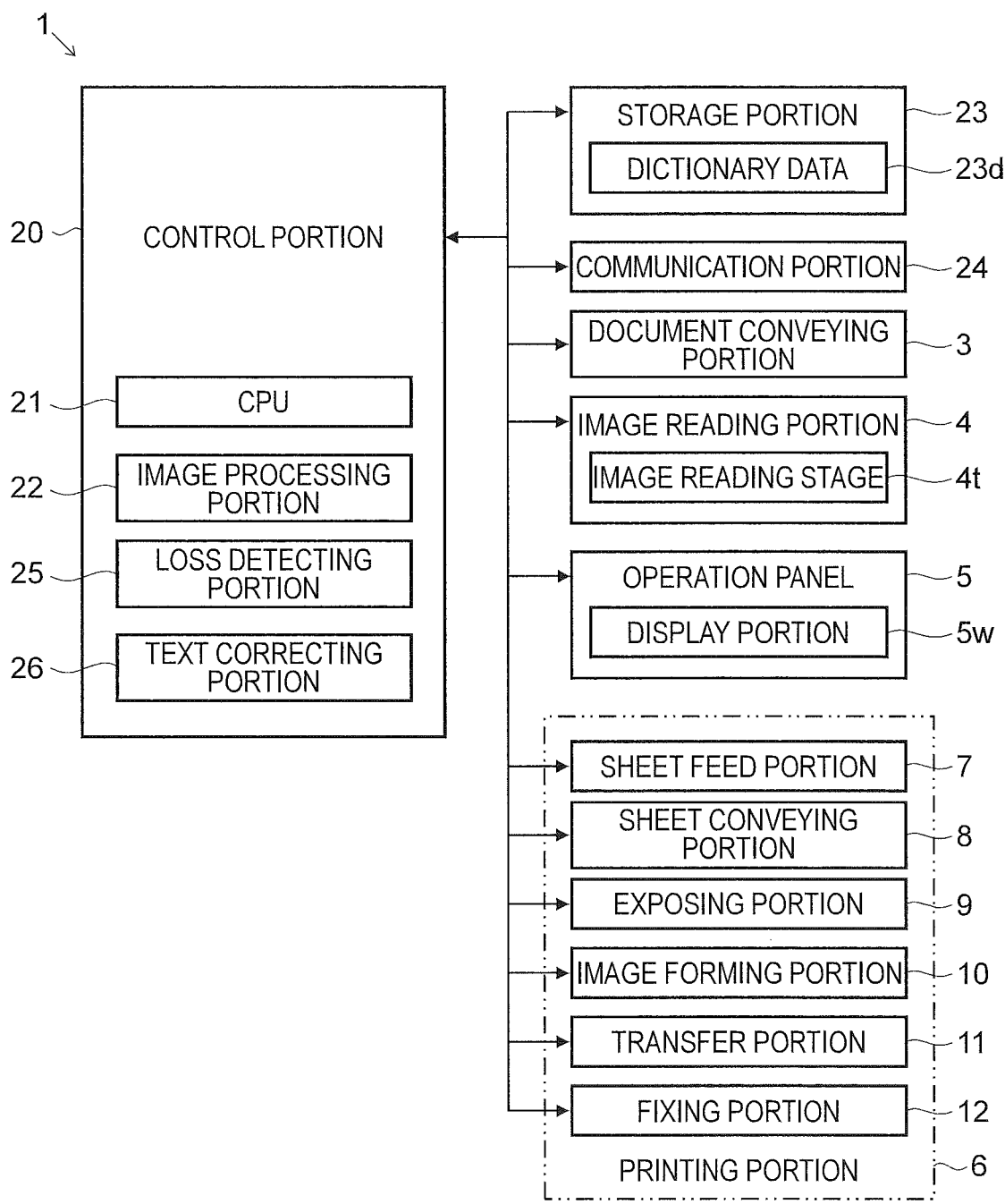
FIG. 1 is a block diagram showing a configuration of an image forming apparatus according to an embodiment of the present disclosure.

First, as to an image forming apparatus according to an embodiment of the present disclosure, its structure will be described with reference to FIG. 1. FIG. 1 is a block diagram showing an example of the structure of the image forming apparatus. The image forming apparatus 1 is a so-called multifunction peripheral having a plurality of functions, such as copying (printing), scanning (image reading), and facsimile transmission.

The image forming apparatus 1 includes a control portion 20 and a storage portion 23 as shown in FIG. 1. The control portion 20 includes, for example, a CPU 21, an image processing portion 22, and other unillustrated electronic circuits and electronic components. The CPU 21 controls the operation of different components provided in the image forming apparatus 1 and executes processing related to the functions of the image forming apparatus 1 based on programs and data for control which are stored in the storage portion 23. The image processing portion 22 performs image processing on image data used in image forming, printing, image reading, and transmission. The storage portion 23 is a combination of a non-volatile storage device, such as unillustrated program ROM and data ROM, and a volatile storage device, such as RAM.

In an upper part of the image forming apparatus 1, a document conveying portion 3 and an image reading portion 4 are provided. The image reading portion 4 includes an image reading stage 4t for reading document images page by page from a document or a book placed on its top face. When a user makes the image forming apparatus 1 execute a copying job or a scanning job, the user places a document containing an image, such as characters, figures, and design patterns, on the document conveying portion 3, or places a document or a book on the image reading stage 4t of the image reading portion 4. The control portion 20 gives an operation instruction to the document conveying portion 3 and the image reading portion 4, and makes them to read the document image. The image data of the document image read by the image reading portion 4 is temporary stored in the storage portion 23 or the like.

In an upper part of the image forming apparatus 1, on the front side of the image reading portion 4, an operation panel (operation portion) 5 is provided. The operation panel 5 includes a display portion 5w. The operation panel 5 accepts, from a user, instructions and the like for making the image forming apparatus 1 execute, for example, a copying (printing) job, a scanning (image reading) job, and a facsimile transmission job. The operation panel 5 accepts input of settings as to, for example, printing conditions, such as type and size of sheets used in printing, enlargement or reduction, and duplex printing or not. The operation panel 5 accepts input of settings as to, for example, facsimile number and sender name in facsimile transmission. The operation panel 5 also functions as a notifying part for notifying users of, for example, device status, cautions, and error messages by displaying them on the display portion 5w. The information on the operation that the operation panel 5 accepts is transmitted to the control portion 20.

The image forming apparatus 1 includes, in a part of it under the image reading portion 4, a printing portion 6. The printing portion 6 executes a printing job. The printing portion 6 includes a sheet feed portion 7, a sheet conveying portion 8, an exposing portion 9, an image forming portion 10, a transfer portion 11, and a fixing portion 12. The sheet feed portion 7 stores a plurality of sheets, and feeds sheets during printing. The sheet conveying portion 8 conveys the sheet fed out from the sheet feed portion 7 to the transfer portion 11 and then to the fixing portion 12, and discharges the sheet having undergone fixing out of the apparatus. The exposing portion 9 radiates laser light controlled based on the image data toward the image forming portion 10. The image forming portion 10 forms an electrostatic latent image of the document image with the laser light emitted from the exposing portion 9, and forms a toner image based on the latent image. The transfer portion 11 transfers the toner image formed on the image forming portion 10 to the sheet. The fixing portion 12 heats and presses the sheet having the toner image transferred to it, and thereby fixes the toner image to the sheet. The control portion 20 controls such printing operation of the printing portion 6.

The image forming apparatus 1 includes a communication portion 24. The communication portion 24 performs communication, such as transmission/reception of facsimile and image data to and from an external communication device, a computer, or the like. The communication portion 24 is connected to a telephone line or a network line, and performs exchange of image data and the like with the external communication device, the computer, or the like by use of such a line. The control portion 20 makes the communication portion 24 execute transmission/reception of data to and from the external communication device or the like.

Figure 2:
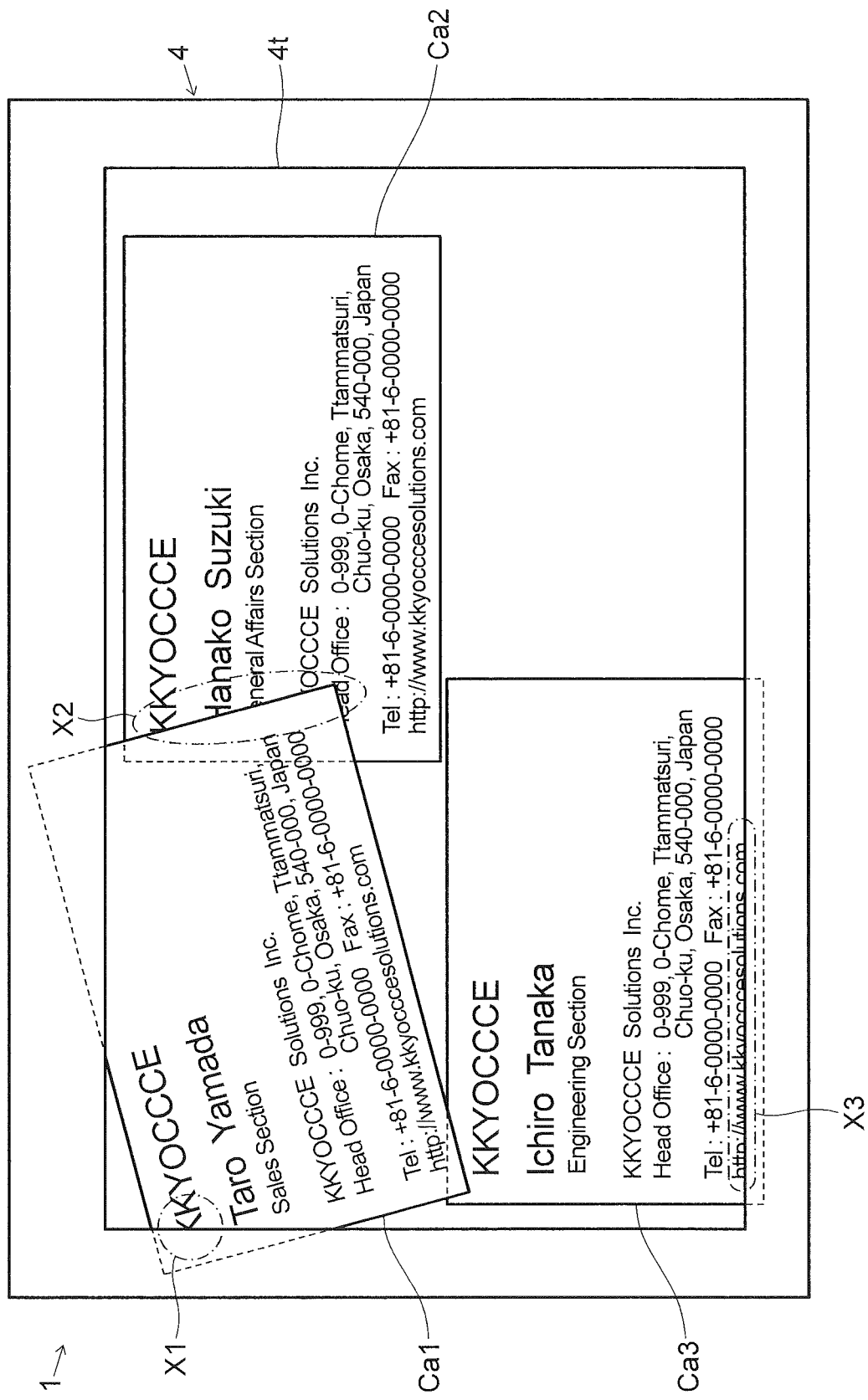
FIG. 2 is an explanatory diagram showing an example of a document state during image reading in the image forming apparatus according to the embodiment of the present disclosure.

Now, the configuration of the image forming apparatus 1 will be described in detail with reference to FIG. 2 along with FIG. 1. FIG. 2 is an explanatory diagram showing an example of the state of a document during image reading by the image forming apparatus 1. FIG. 2 shows a state, as seen from below, of the image reading stage 4t of the image reading portion 4 on which documents Ca1, Ca2, and Ca3 are placed.

The image processing portion 22 performs a character recognition process on the document image and acquires character data. In the character recognition process, for example, an OCR (optical character recognition) technology is used. In the character recognition process, the image processing portion 22 extracts character images from image data. The image processing portion 22 performs a matching process to compare the extracted character images with character patterns stored in the storage portion 23 as dictionary data 23d, and recognizes characters.

The storage portion 23 includes the dictionary data 23d. The dictionary data 23d stores, for example, character patterns for pattern matching used in the character recognition process by the image processing portion 22. The dictionary data 23d includes character patterns for pattern matching of different kinds of characters, such as alphabet letters and hiragana, katakana, and kanji characters.

Moreover, in the storage portion 23, a plurality of characters and words are registered. As the character data, characters used in various languages are included, for example, alphabet letters and hiragana, katakana, and kanji characters. As the word data, words are registered, for example, nouns (common nouns, proper nouns), verbs, adjectives, pronouns, articles, adverbs, prepositions, and conjunctions of various languages. For example, as proper nouns, it is possible to register the names of well-known countries, places, companies, historic places, facilities, and persons.

The control portion 20 includes a loss detecting portion 25 and a text correcting portion 26. The functions of the loss detecting portion 25 and the text correcting portion 26 are achieved, for example, by the CPU 21 performing operational processing according to a program, but may instead be achieved with electronic hardware circuits.

Here, for example, consider a case where, during image reading, three business-card size documents Ca1, Ca2, and Ca3 are placed on the image reading stage 4t, resulting in a document state as shown in FIG. 2. In the example shown in FIG. 2, parts of documents Ca1 and Ca3 lie outside the edge of the image reading stage 4t. Parts of documents Ca1 and Ca2 overlap with each other. Thus, the document images of documents Ca1, Ca2, and Ca3 have lost parts X1, X2, and X3 respectively.

In this document state, the loss detecting portion 25 detects, based on the dictionary data 23d, a lost part in the character data that the image processing portion 22 acquired by performing the character recognition process on the document image. The loss detecting portion 25 detects the lost parts by matching the character data acquired from the document image with characters and words registered in the dictionary data 23d. For example, like the lost parts X1 and X2, when a word in character data is a character string of upper-case alphabet letters, the loss detecting portion 25 detects a lost part by matching with proper nouns registered in the dictionary data 23d. For another example, like the lost part X3, when many letters included in a word or a character string are lost, the loss detecting portion 25 detects a lost part by matching with character patterns for pattern matching registered in the dictionary data 23d.

If there is a lost part in character data, the text correcting portion 26 extracts a candidate character or word for correcting the lost part from the dictionary data 23d, and corrects the lost part in character data with the extracted character or word. The text correcting portion 26 analyzes, for example, context, use prediction, counting words, prefixes, and suffixes, and extracts a candidate character or word for correcting the lost part from the dictionary data 23d.

In context analysis, the relationship of the lost part with the parts proceeding and following it in context is analyzed. For example, if the word including a lost part is a character string of upper-case alphabet letters, or if the word stands at the beginning of a document, or if the word appears in a line ending with a specific word, such as "Inc.", "School", or "Hospital", the word including the lost part is found to be a proper noun. For example, in the case of the lost parts X1 and X2, the text correcting portion 26 finds the word "KYOCCCE" including the lost part to be a proper noun, and extracts a correction candidate proper noun "KKYOC-CCE" from the dictionary data 23d.

For another example, in context analysis, in the case of the lost part X2, based on the word "Section" at the end of the line that includes the word "neral" including the lost part, the line is found to be the name of an organization. Then, a correction candidate word "General" in "General Affairs Section" is extracted from the dictionary data 23d.

For another example, in context analysis, in the case of the lost part X3, the words "http" and "www" at the beginning of the line are detected by matching with character patterns for pattern matching, and thus the line is found to be a web site address on the Internet. Then, a correction candidate word of the web site address corresponding to the character pattern following "www" is extracted from the dictionary data 23d.

In use prediction analysis, the character data acquired by performing the character recognition process on document images is accumulated, and the frequency and situation of use of the accumulated characters and words are learned, and thereby characters and words that are likely to be used next are predicted. In counting word analysis, the relationship of a numeral with a counting word in the lost part is analyzed. In prefix/suffix analysis, the relationship of a prefix or a suffix in the lost part is analyzed.

The text correcting portion 26 corrects the lost part in character data by use of a correction candidate character or word which is extracted from the dictionary data 23d. The text correcting portion 26 has the following two processing modes regarding character correction using a correction candidate, and one of those modes can be selected as necessary. One is an automatic processing mode in which the lost part is corrected without accepting selection or input of a correction candidate character or word by a user via the operation panel 5. The other is an operation accepting processing mode in which the lost part is corrected by accepting selection or input of a correction candidate character or word by a user via the operation panel 5.

Figure 3:
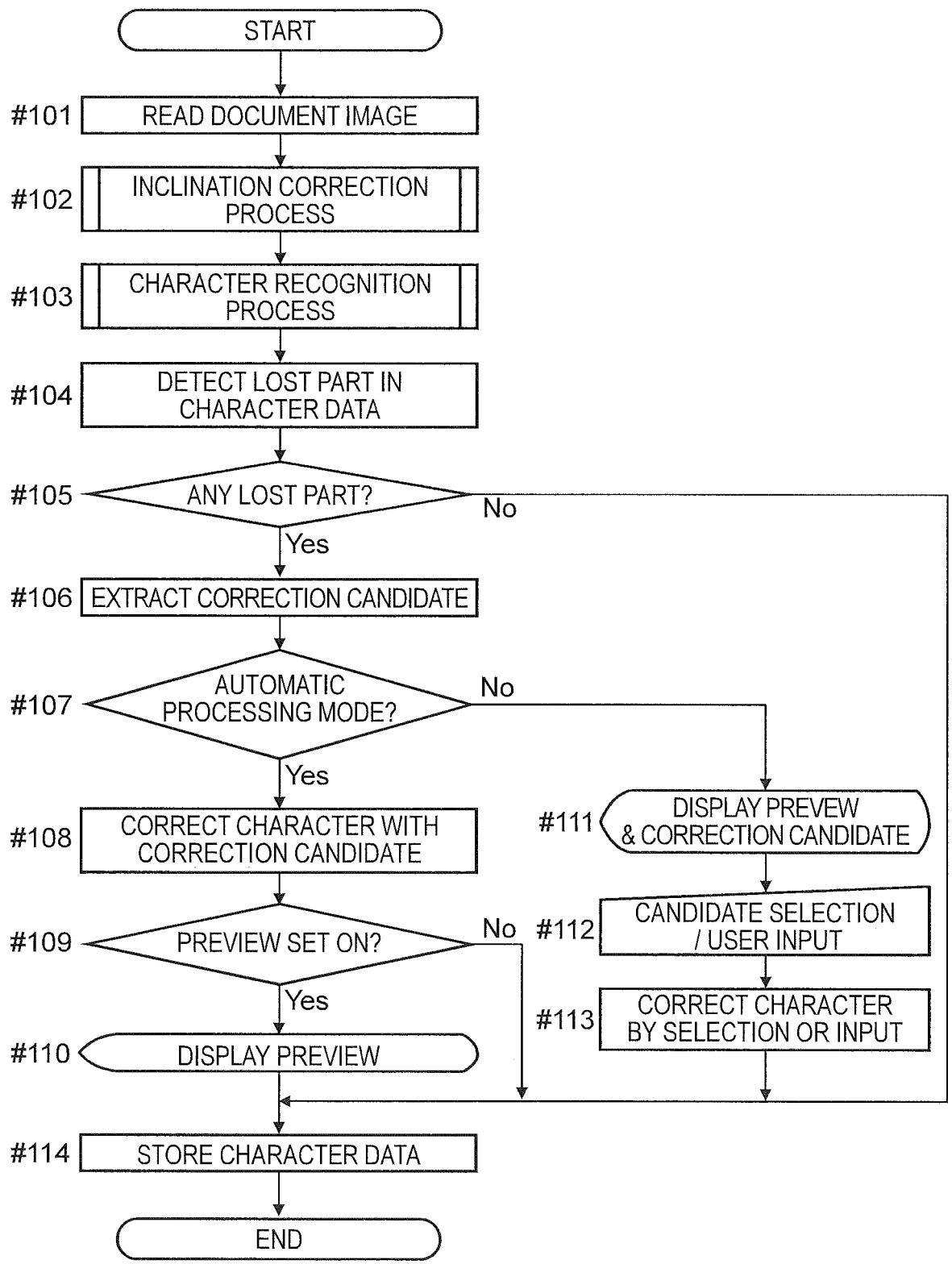
FIG. 3 is a flow chart showing an example of image reading processing in the image forming apparatus according to the embodiment of the present disclosure.

Next, an example of image reading processing in the image forming apparatus 1 will be described along the flow shown in FIG. 3. FIG. 3 is a flow chart showing an example of image reading processing in the image forming apparatus 1.

In the image forming apparatus 1, when, for example, a scanning job is accepted, image reading operation is started. (START in FIG. 3)

At step #101, image data of a document image is read by the image reading portion 4. Here, for example, a document is placed on the image reading stage 4t by a user, and a Start key for image reading processing is depressed on the operation panel 5. The image data of the document image is stored in the storage portion 23.

At step #102, the image processing portion 22 detects the inclination of a character string after the character recognition process, and corrects the inclination of the character string. The image processing portion 22 has a function of detecting separately, on one hand, a case where a document itself is inclined or a whole document image is inclined relative to the scanning direction for image reading, and, on the other hand, a case where only a character string itself is inclined partially in the document image. The image processing portion 22 also has a function of correcting the inclination of a character string in the document image. Here, when a detected inclination is larger than a previously set upper limit value, the text correcting portion 26 makes the display portion 5w display the document image read by the image reading portion 4. It is then preferable to request the user to re-place the document on the image reading stage 4t.

At step #103, the image processing portion 22 performs the character recognition process on the document image read by the image reading portion 4 and acquires character data. The character data acquired from the document image is stored in the storage portion 23.

At step #104, the loss detecting portion 25 detects, based on the dictionary data 23d, a lost part in the character data that the image processing portion 22 acquired by performing the character recognition process on the document image. The loss detecting portion 25 detects the lost part by matching the character data acquired from the document image with characters and words registered in the dictionary data 23d.

At step #105, whether or not the character data acquired from the document image has a lost part is checked. If the character data has a lost part, the flow proceeds to step #106. If there is no lost part in the character data, the flow proceeds to step #114.

At step #106, the text correcting portion 26 extracts a candidate character or word for correcting the lost part from the dictionary data 23d. By analyzing the character data, the text correcting portion 26 extracts the candidate character or word for correcting the lost part from the dictionary data 23d.

At step #107, whether or not character correction by the text correcting portion 26 is in the automatic processing mode is checked. If the character correction is in the automatic processing mode, the flow proceeds to step #108. If the character correction is not in the automatic processing mode but in the operation accepting processing mode, the flow proceeds to step #111.

At step #108, that is, if the character correction is in the automatic processing mode, the text correcting portion 26 corrects the lost part in character data by use of a correction candidate character or word which is extracted from the dictionary data 23d.

At step #109, whether or not a setting for a preview on the display portion 5w as to the corrected character data is ON is checked. The user can set a preview ON or OFF previously on the operation panel 5. If the preview is set ON, the flow proceeds to the step #110. If the preview is set OFF, the flow proceeds to the step #114.

At step #110, the character data corrected by the text correcting portion 26 is displayed on the display portion 5w. A character or word corrected by the text correcting portion 26 may be emphasized, for example, by being displayed in a different color from a character or word that does not need correction, or by being highlighted.

At step #111, that is, if the character correction is in the operation accepting processing mode, the text correcting portion 26 makes the display portion 5w display a preview of the character data and further display a plurality of candidate characters or words for correcting the lost part.

At step #112, selection of a correction candidate character or word displayed on the display portion 5w is accepted, or input of a character or word different from the correction candidate character or word displayed on the display portion 5w is accepted by the user via the operation panel 5. The user selects, on the operation panel 5, one of a plurality of candidate characters or words for correcting the lost part extracted by the text correcting portion 26. If there is no desired character or word among correction candidates displayed on the display portion 5w, the user can enter, on the operation panel 5, a character or word different from the correction candidate character or word displayed on the display portion 5w.

At step #113, the text correcting portion 26 corrects the lost part in character data based on the character or word selected or entered by the user.

At step #114, the character data is stored. That is, if there is a lost part in the character data recognized from the image data of the document image, the character data corrected based on the dictionary data 23d is eventually stored in the storage portion 23 or the like. Then, the image reading processing is ended. (END in FIG. 3)

As the embodiments described above, the image forming apparatus 1 includes the loss detecting portion 25 and the text correcting portion 26. The loss detecting portion 25 detects, based on the dictionary data 23d, a lost part in the character data that the image processing portion 22 has acquired. If there is a lost part in character data, the text correcting portion 26 extracts a candidate character or word for correcting the lost part from the dictionary data 23d, and corrects the lost part in character data.

With this configuration, for example, if, as shown in FIG. 2, there are lost parts X1, X2, and X3 in peripheral parts of documents and a part in which documents overlap when the document image is read, it is possible to automatically correct the lost parts with correction candidate characters or words extracted from the dictionary data 23d. Thus, it is not necessary for a user to have a preview displayed every time to check the document image. In this way, in the image forming apparatus 1, it is possible to allow image reading with improved operability.

The image forming apparatus 1 includes the display portion 5w which displays the character or word corrected by the text correcting portion 26. Thus, by showing a preview on the display portion 5w as necessary, it is possible to check the corrected document image.

The text correcting portion 26 extracts a plurality of correction candidate characters or words from the dictionary data 23d and displays them on the display portion 5w. The text correcting portion 26 corrects a lost part based on the character or word selected by the user via the operation panel 5 from among the plurality of correction candidate characters or words. With this configuration, it is possible to improve image reading accuracy.

The text correcting portion 26 corrects a lost part based on the character or word entered by the user via the operation panel 5 instead of the correction candidate character or word. With the configuration, if there is no desired character or word among the correction candidates extracted by the text correcting portion 26, the user can correct a lost part based on a character or word desired by him or herself. Thus, it is possible to further improve image reading accuracy.

In the correction of a lost part, the text correcting portion 26 can select one of the automatic processing mode and the operation accepting processing mode as necessary. With the configuration, it is possible to make the image forming apparatus 1 perform image reading processing to suit various situations.

The image processing portion 22 detects the inclination of a character string after the character recognition process, and corrects for the inclination of the character string. That is, the loss detecting portion 25 detects a lost part in the character data that the image processing portion 22 has acquired and has corrected for the inclination of the character string. Thus, it is possible to automatically detect a lost part in the character data and to improve correction accuracy. In this way, the need for display a preview further lowers and it is possible to allow image reading with improved operability. Then, when the inclination of the character string detected by the image processing portion 22 is larger than a previously set upper limit value, the text correcting portion 26 makes the display portion 5w display the document image read by the image reading portion 4. Thus, it is possible to request the user to re-place the document on the image reading stage 4t.

It should be understood that the embodiments of the present disclosure described above are in no way meant to limit its scope; the present disclosure can be implemented with any modifications made without departing from its spirit.

For example, the state of a document during image reading shown in FIG. 2 is merely one example, and the realization of the present disclosure can be carried out in any state other than FIG. 2. For example, the document is not limited to a business-card size document, but may instead be an ordinary document with text or the like on it. For another example, characters and words (the language) in the document are not limited to alphabet letters and English, but may instead be hiragana, katakana, and kanji characters and Japanese, or may instead be any other characters and words (languages).

What is claimed is:

1. An image forming apparatus comprising:
   an image reading portion having an image scanner and reading a document image from a document or a book;
   a storage portion configured as a storage device including a ROM and a RAM and storing dictionary data in which a plurality of characters and a plurality of words are registered;
   an image processing portion configured as a program or a hardware circuit and acquiring character data by performing a character recognition process on the document image read by the image reading portion;
   a loss detecting portion configured as a program or a hardware circuit and detecting a lost part in the character data by comparing the character data acquired from the document image by the image processing portion with characters and words registered in the dictionary data;
   a text correcting portion configured as a program or a hardware circuit and extracting a correction candidate character or word for correcting the lost part from the dictionary data and correcting the lost part with the extracted correction candidate character or word when the character data has the lost part detected by the loss detecting portion;
   a display portion displaying the correction candidate character or word extracted from the dictionary data by the text correcting portion; and
   an operation portion accepting selection of the correction candidate character or word displayed on the display portion,
   wherein
   the text correcting portion
   extracts a plurality of correction candidate characters or words from the dictionary data,
   displays the plurality of correction candidate characters or words on the display portion, and
   corrects the lost part based on a character or word selected by a user via the operation portion from among the plurality of correction candidate characters or words.

2. The image forming apparatus according to claim 1, further comprising:
   the display portion displaying the character or word corrected by the text correcting portion.

3. The image forming apparatus according to claim 1, wherein
   the operation portion accepts input of a character or word different from the correction candidate character or word displayed on the display portion; and
   the text correcting portion corrects the lost part based on the character or word entered via the operation portion.

4. The image forming apparatus according to claim 1, wherein
   the text correcting portion has:
   an automatic processing mode in which the lost part is corrected without accepting selection or input of the correction candidate character or word via the operation portion; and
   an operation accepting processing mode in which the lost part is corrected by accepting selection or input of the correction candidate character or word via the operation portion,
   one of the two processing modes being freely selectable.

5. An image forming apparatus comprising:

an image reading portion having an image scanner and reading a document image from a document or a book;

a storage portion configured as a storage device including a ROM and a RAM and storing dictionary data in which a plurality of characters and a plurality of words are registered;

an image processing portion configured as a program or a hardware circuit and acquiring character data by performing a character recognition process on the document image read by the image reading portion;

a loss detecting portion configured as a program or, a hardware circuit and detecting a lost part in the character data by comparing the character data acquired from the document image by the image processing portion with characters and words registered in the dictionary data;

a text correcting portion configured as a program or a hardware circuit and extracting a correction candidate character or word for correcting the lost part from the dictionary data and correcting the lost part with the extracted correction candidate character or word when the character data has the lost part detected by the loss detecting portion; and a display portion, wherein the image processing portion detects an inclination of a character string in the character data after the character recognition process, and corrects for the inclination of the character string; and the text correcting portion makes the display portion display the document image read by the image reading portion when the inclination detected by the image processing portion is larger than a previously set upper limit value.

* * * * *